United States Patent
Zhou

(10) Patent No.: US 9,326,184 B2
(45) Date of Patent: Apr. 26, 2016

(54) POLICY AND CHARGING CONTROL FOR MULTIPLE SUB-FLOWS

(71) Applicant: Huawei Technologies Co., Ltd., Shenzhen, Guangdong (CN)

(72) Inventor: Wei Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 14/085,206

(22) Filed: Nov. 20, 2013

(65) Prior Publication Data

US 2014/0078899 A1 Mar. 20, 2014

Related U.S. Application Data

(63) Continuation of application No. PCT/CN2011/075712, filed on Jun. 14, 2011.

(51) Int. Cl.
*H04W 28/02* (2009.01)
*H04L 12/24* (2006.01)
*H04L 12/721* (2013.01)
*H04L 12/725* (2013.01)
(Continued)

(52) U.S. Cl.
CPC ....... *H04W 28/0268* (2013.01); *H04L 41/0893* (2013.01); *H04L 41/5022* (2013.01);
(Continued)

(58) Field of Classification Search
CPC . H04L 45/123; H04L 45/308; H04L 41/0893; H04W 76/022; H04W 76/025; H04W 28/0268
See application file for complete search history.

(56) References Cited

U.S. PATENT DOCUMENTS 8,774,207 B2 * 7/2014 Bekiares et al. .............. 370/431
2008/0046963 A1 2/2008 Grayson et al.
(Continued)

FOREIGN PATENT DOCUMENTS

CN 101378586 A 3/2009
CN 101384076 A 3/2009
(Continued)

OTHER PUBLICATIONS

"3GPP TS 29.214—$3^{rd}$ Generation Partnership Project; Technical Specification Group Core Network and Terminals; Policy and Charging Control over Rx reference point (Release 11)," Version 11.0.0, $3^{rd}$ Generation Partnership Project, Valbonne, France (Mar. 2011).
(Continued)

*Primary Examiner* — Raj Jain
(74) *Attorney, Agent, or Firm* — Leydig, Voit & Mayer, Ltd.

(57) ABSTRACT

A policy control method, a related device and a policy and charging control system in a mobile communication system. The policy control method includes: obtaining description information of two or more sub-flows, wherein the two or more sub-flows belong to a same application; respectively generating policy and charging control PCC rules for the two or more sub-flows according to the description information of the two or more sub-flows; and transmitting at least one generated PCC rule to a PCEF entity or a bearing binding and event report function BBERF entity, so as to perform policy control for the sub-flows by the PCEF entity or the BBERF entity. With the method, device and system according to embodiments of the present invention, a network side entity of the 3GPP network learns that the same application includes multiple sub-flows, and learns the description information of each sub-flow.

22 Claims, 6 Drawing Sheets

(51) Int. Cl.
  *H04W 76/02* (2009.01)
  *H04L 12/26* (2006.01)
(52) U.S. Cl.
  CPC ........... *H04W76/022* (2013.01); *H04L 43/028* (2013.01); *H04L 45/123* (2013.01); *H04L 45/308* (2013.01); *H04W 76/025* (2013.01)

(56) References Cited

U.S. PATENT DOCUMENTS

| | | | | |
|---|---|---|---|---|
| 2012/0324100 | A1* | 12/2012 | Tomici et al. | 709/224 |
| 2013/0016677 | A1* | 1/2013 | Kunz et al. | 370/329 |
| 2014/0153504 | A1* | 6/2014 | Wang et al. | 370/329 |
| 2014/0161055 | A1* | 6/2014 | Chitrapu et al. | 370/329 |

FOREIGN PATENT DOCUMENTS

| | | |
|---|---|---|
| CN | 101692727 A | 4/2010 |
| EP | 2480015 A1 | 7/2012 |
| WO | 2010080966 A1 | 7/2010 |
| WO | 2011032441 A1 | 3/2011 |
| WO | 2011075293 A1 | 6/2011 |

OTHER PUBLICATIONS

"3GPP TS 23.203—3$^{rd}$ Generation Partnership Project; Technical Specification Group Services and System Aspects; Policy and charging control architecture (Release 11)," Version 11.2.0, 3$^{rd}$ Generation Partnership Project, Valbonne, France (Jun. 2011).

* cited by examiner

POLICY AND CHARGING CONTROL FOR MULTIPLE SUB-FLOWS

CROSS-REFERENCE TO RELATED APPLICATIONS

This application is a continuation of International Patent Application No. PCT/CN2011/075712, filed on Jun. 14, 2011, which is hereby incorporated by reference in its entirety.

TECHNICAL FIELD

Embodiments of the present invention relate to the field of communications and, in particular to a policy control method, a related device and a policy and charging control (PCC, Policy and Charging Control) system.

BACKGROUND

With the advent of the mobile broadband era, higher requirements, such as a higher transmission rate, a smaller time delay and a higher system capacity, have been proposed on a mobile communication network. Research and standardization work for two major plans of a long term evolution (LTE, Long Term Evolution) and a system architecture evolution (SAE, System Architecture Evolution) have been started by the 3GPP standardization organization at the end of 2004, with the aim of keeping advantages of the 3rd Generation Partnership Project (3GPP, 3rd Generation Partnership Project) network. In the 3GPP LTE/SAE mobile communication network technology, the radio access network and the core network are respectively referred to as the evolved universal terrestrial radio access network (E-UTRAN, Evolved Universal Terrestrial Radio Access Network) and the evolved packet core network (EPC, Evolved Packet Core), and the whole network system is named the evolved packet system (EPS, Evolved Packet System). Different from the traditional universal mobile telecommunications system (UMTS, Universal Mobile Telecommunications System) network architecture, the EPS network architecture is an Internet protocol (IP, Internet Protocol) network architecture, and supports a variety of access technologies of 3GPP and non-3GPP wireless systems, such as global system for mobile communication (GSM, Global System For Mobile Communication), enhanced data rate for GSM evolution (EDGE, Enhanced Data Rate for GSM Evolution) radio access network (GE-RAN, GSM EDGE Radio Access Network)/universal terrestrial radio access network (UTRAN, Universal Terrestrial Radio Access Network), E-UTRAN, wireless local area network (WLAN, Wireless Local Area Network), WiMAX, CDMA2000.

A policy control and charging (PCC) architecture is introduced at R7 stage of the 3GPP, for performing unified policy control and charging to the EPS network. The policy control solution in the current PCC architecture is flow-based, and each service flow is processed according to one application. Such policy control solution is applicable to a case where one application only has one service flow, while the case where the service data of one application are transmitted via multiple channels at the same time, that is, one application includes multiple service flows at the same time, is not supported.

SUMMARY

Embodiments of the present invention provide a policy control method, a device and a PCC system. Through embodiments of the present invention, policy control for multiple sub-flows can be performed correctly.

One aspect of embodiments of the present invention provides a policy control method, including: obtaining description information of two or more sub-flows, where the two or more sub-flows belong to a same application; respectively generating policy and charging control PCC rules for the two or more sub-flows according to the description information of the two or more sub-flows; and transmitting at least one generated PCC rule to a policy and charging enforcement function (PCEF, Policy and Charging Enforcement Function) entity or a bearing binding and event report function (BBERF, Bearing Binding and Event Report Function) entity, so as to perform policy control for the sub-flows by the PCEF entity or the BBERF entity.

Another aspect of embodiments of the present invention provides a policy and charging rule function (PCRF, Policy and Charging Rule Function) device, including: an information acquisition unit, configured to obtain description information of two or more sub-flows, where the two or more sub-flows belong to a same application; a policy and charging control (PCC) rule generation unit, configured to respectively generate PCC rules for the two or more sub-flows according to the description information of the two or more sub-flows; and a PCC rule transmission unit, configured to transmit at least one generated PCC rule to a policy and charging enforcement function (PCEF) entity or a bearing binding and event report function (BBERF) entity, so as to perform policy control for the sub-flows by the PCEF entity or the BBERF entity.

Another aspect of embodiments of the present invention provides a policy and charging control PCC system, and the PCC system includes an application function (AF, Application Function) and a PCRF device. The AF device includes: a receiving unit, configured to receive application information from a user equipment UE, where the application information includes description information of two or more sub-flows, and the two or more sub-flows belong to a same application; a conversion unit, configured to convert the application information to session information; and an information transmission unit, configured to transmit the session information to a policy and charging rule function PCRF device, where the session information includes the description information of the two or more sub-flows. The PCRF device includes: an information acquisition unit, configured to receive the session information transmitted by the information transmission unit of the AF device and obtain the description information of the two or more sub-flows from the session information; a PCC rule generation unit, configured to respectively generate PCC rules for the two or more sub-flows according to the description information of the two or more sub-flows; and a PCC rule transmission unit, configured to transmit at least one generated PCC rule to a policy and charging enforcement function PCEF entity or a bearing binding and event report function BBERF entity, so as to perform policy control for the sub-flows by the PCEF entity or the BBERF entity.

Another aspect of embodiments of the present invention provides a policy and charging control (PCC) system, and the PCC system includes a policy enforcement device and a PCRF device. The policy enforcement device includes: an inspection unit, configured to inspect whether two or more sub-flows belong to a same application; an information transmission unit, configured to transmit description information of the two or more sub-flows to a policy and charging rule function PCRF device when inspecting that the two or more sub-flows belong to a same application; a PCC rule receiving unit, configured to receive PCC rules from the PCRF device;

and an enforcement unit, configured to perform policy control for the sub-flows based on the PCCs rule received by the PCC rule receiving unit. The PCRF device includes: a receiving unit, configured to receive the description information of the two or more sub-flows transmitted by the transmission unit of the policy enforcement device; a PCC rule generation unit, configured to respectively generate PCC rules for the two or more sub-flows according to the received description information of the two or more sub-flows; and a PCC rule transmission unit, configured to transmit at least one generated PCC rule to the policy enforcement device. The policy enforcement device can be a policy and charging enforcement function (PCEF) device or a bearing binding and event report function (BBERF).

According to embodiments of the present invention, a network side learns description information of multiple sub-flows belonging to the same application, such as IP address information, related information of quality of service (QoS, Quality of Service) and so on, so that policy control for multiple sub-flows belonging to the same application can be performed correctly.

BRIEF DESCRIPTION OF DRAWINGS

To illustrate the technical solutions in embodiments of the present invention more clearly, accompanying drawings needed for describing the embodiments are illustrated briefly in the following. Apparently, the accompanying drawings described below only show certain embodiments of the invention, and persons skilled in the art can derive other drawings from them without creative efforts.

DESCRIPTION OF EMBODIMENTS

The technical solutions in embodiments of the present invention are hereinafter described clearly and completely with reference to the accompanying drawings in the embodiments of the present invention. Obviously, the embodiments described here are part of the embodiments of the present invention and not all of the embodiments. All other embodiments, which can be derived by persons skilled in the art from the embodiments given herein without creative efforts, shall fall within the protection scope of the present invention.

Figure 1:
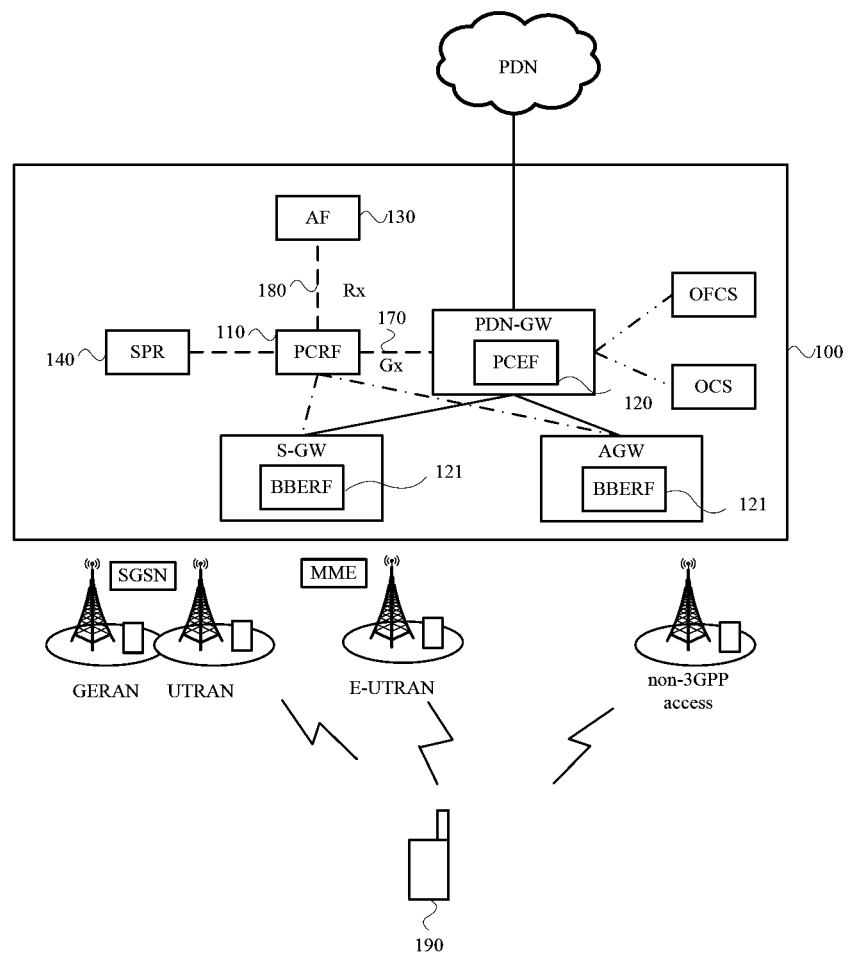
FIG. 1 is a schematic diagram of an exemplary PCC architecture.

FIG. 1 is a schematic diagram of an exemplary PCC architecture. As shown in FIG. 1, the functional entities of the PCC architecture 100 mainly include a PCRF entity 110, a PCEF entity 120, a BBERF entity 121, an AF entity 130 and a user subscription profile repository (SPR, Subscription Profile Repository) 140. The PCRF entity 110 interacts with the PCEF entity 120 via a Gx interface 170, and the PCRF entity 110 interacts with the AF entity 130 via an Rx interface 180. Both the Gx interface 170 and the Rx interface 180 adopt the Diameter protocol. The Diameter protocol is a security protocol for authentication, authorization and charging.

The PCRF entity 110 is mainly to perform a policy decision control function. Specifically, the PCRF entity 110 receives session information from the AF entity 130 via the Rx interface 180, and receives access type information and access network information including other information associated with the network access from the PCEF entity 120 via the Gx interface 170, and meanwhile, the PCRF entity 110 also can receive information of a subscribed user from the SPR 140. The PCRF entity 110 generates a PCC rule on a service session level, based on the received information and a policy rule configured by an operator, and supplies the PCC rule to the PCEF entity 120 and/or the BBERF entity 121. Another task of the PCRF entity 110 is to forward an event subscribed by the AF entity among the BBERF entity 121, the PCEF entity 120 and the AF entity 130.

The PCEF entity 120 and the BBERF entity 121 perform the PCC rule received from the PCRF entity 110, and provide user related information and access network information to the PCRF entity 110 via the Gx interface 170.

The AF entity 130 is responsible for providing user and application related dynamic information. The AF entity 130 interacts with an application or a service which needs to acquire the dynamic PCC rule. Generally, an application layer signaling of the service terminates on the AF entity 130. The AF entity 130 can parse out application information from an application layer signaling packet, convert the application information to session information, and then provide the session information to the PCRF entity 110 via the Rx interface 180.

In a practical network, the PCRF entity 110 can be implemented in a PCRF network element; the PCEF entity 120 can be located in a gateway, such as a packet data network (PDN, Packet Data Network) gateway (PDN-GW, PDN-Gate Way); the BBERF entity 121 can be implemented in a serving gateway (S-GW, Serving GateWay) or an access gateway (AGW, Access GateWay); as for the AF entity 130, the function of AF entity can be implemented by a corresponding network entity in a specific network, for example, in an IP multimedia subsystem (IMS, IP Multimedia Subsystem), the function of AF entity can be implemented by a proxy call session control function (P-CSCF, Proxy Call Session Control Function), for another example, the AF entity can be implemented in an application server (such as, video streaming media server) for a non-IMS.

It should be noted that, the deployment of various functional entities in the PCC architecture described above in the practical network is merely exemplary, but not intended to limit embodiments of the present invention.

The PCEF entity is merely described hereinafter, however, it should be noted that, all the operations performed by the PCEF entity can be performed by the BBERF entity 121 alternatively.

As shown in FIG. 1, the PCC architecture 100 also can include a functional entity, such as an offline charging system (OFCS, Offline Charging System) and an online charging system (OCS, Online Charging System), and descriptions thereof may be omitted so as not to obscure the focus of embodiments of the present invention.

In addition, as shown in FIG. 1, the PCC architecture 100 supports a variety of access technologies including GERAN/UTRAN, E-UTRAN and non-3GPP access technology. The UE 190 can access the network through different access technologies, so as to make use of resources of the network such as PDN. When the UE 190 accesses the network through different access technologies, the PCC architecture 100 can provide corresponding policy and charging control.

Figure 2:
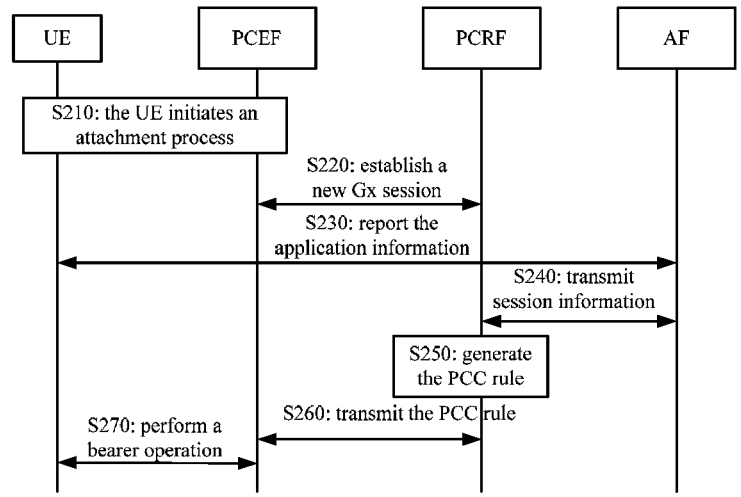
FIG. 2 is schematic diagram of a policy control process in the prior art.

FIG. 2 illustrates a policy control process when a UE running a common application accesses to a network in the prior art. Here, the common application only includes one service data flow, compared to a "multiple sub-flows application". The "multiple sub-flows application" will be described hereinafter.

As shown in FIG. 2, in S210, the UE initiates a network attachment process to a core network after the boot. The attachment process refers to a registration process in the network before the UE performs a practical service. During the attachment process, the UE can obtain an IP address allocated by a network side.

In S220, the PDN-GW establishes a new Gx session with the PCRF entity 110. The Gx session can be used for transferring the PCC rule. In embodiments of the present invention, the PCEF entity 120 can be implemented on the PDN-GW, so that the PDN-GW can perform the function of the PCEF entity. Hereinafter, unless expressly stated to the contrary, all the operations performed by the PDN-GW are performed by the PCEF entity included in the PDN-GW.

In S230, the UE reports the application information to the AF entity 130. Specifically, the UE reports the running application information to the AF entity via a specific signaling, such as a session initiation protocol (SIP, Session Initiation Protocol) signaling. Here, the application information refers to application layer session information transferred by the UE via a specific signaling message (for example, in an SIP signaling, via a session description protocol (SDP, Session Description Protocol) for description), and can include an application related media type and media format, the bandwidth required, type of access network, type of IP address and etc., for allocating appropriate network resources by the network side.

In S240, the AF entity 130 generates session information, and transmits the session information to the PCRF entity 110. Specifically, after receiving the application information transmitted from the UE, the AF entity 130 generates the session information corresponding to the received application information, and transmits the session information to the PCRF entity 110. For example, the AF entity 130 can establish an Rx session with the PCRF entity 110, so as to transmit the session information to the PCRF entity through the Rx session via the Rx interface 180.

In S250, the PCRF entity 110 makes a decision to generate the PCC rule. Specifically, the PCRF entity 110 makes a decision to generate the PCC rule for the UE, according to the session information which is received from the AF entity 130 and corresponds to application information from the UE, and, for example, user information and operator configuration received from the SPR.

In S260, the PCRF entity 110 transmits the generated PCC rule to the PDN-GW. Specifically, after generating the PCC rule, the PCRF entity 110 transmits the PCC rule to the PDN-GW via the Gx interface.

In S270, the PCEF entity 120 on the PDN-GW performs a bearer operation corresponding to the received PCC rule. For example, the PCEF entity 120 on the PDN-GW performs a bearer operation, such as adding, modifying or deleting a bearer, based on the PCC rule received from the PCRF entity 110.

Up to this point, a policy control process for one application completes.

It should be noted that, although S230 is described as the UE reporting the application information, as will be appreciated by persons skilled in the art, "the UE reporting the application information" is actually an interaction process; for example, the AF entity can return acknowledgment information to the UE upon receiving the application information transmitted by the UE. Similarly, information transmission in S240 and S260 as well as the bearer operation in S270 all relate to an interaction process. Such interaction is well known for persons skilled in the art, and the details will not be described hereafter again.

The above-mentioned policy control process is applicable to a case where one application only has one service data flow at the same time, while the case where the service data of one application are transmitted via multiple physical transmission channels at the same time, that is, one application includes multiple service data flows at the same time, is not taken into account.

As described above, the EPS network architecture supports a variety of access technologies of 3GPP and non-3GPP wireless systems, such as GERAN/UTRAN, E-UTRAN WLAN, WiMAX, CDMA2000. When the UE supports a variety of access technologies, the case where the service data of the same application of the UE are transmitted via multiple access networks at the same time, can be taken into account, and at this time, one application includes multiple service data flows at the same time. Hereinafter, for ease of description, multiple service data flows belonging to the same application are referred to as multiple sub-flows of the application. It should be noted that, the multiple sub-flows of the application can be transmitted through different access networks respectively, as described above, but not limited to this, for example, the case where multiple sub-flows belonging to the same application are transmitted through the same access network is not excluded. The "multiple sub-flows belonging to the same application" herein refers to multiple sub-flows belonging to the same service, for example, the multiple sub-flows all belong to a web browsing service, or the multiple sub-flows all belong to an audio or a video downloading service, and so on. Of course, the specific service mentioned herein is merely exemplary, but not intended to limit embodiments of the present invention.

One problem of achieving multiple sub-flows transmission in the 3GPP network lies in that, the policy control process in the prior art is based on the case where one application only has a data flow, while the case of multiple sub-flows is not taken into account. Accordingly, embodiments of the present invention provide a policy control method and a device supporting multiple sub-flows. According to the policy control method of the embodiments of the present invention, a network side entity obtains description information of multiple sub-flows belonging to the same application, transmits the description information of the multiple sub-flows to a PCRF entity, then the PCRF entity makes a decision to generate the corresponding PCC rule and issues it to the PDN-GW, for indicating the PCEF entity to perform accurate policy processing for the multiple sub-flows. In an exemplary embodiment, the UE can report description information of the multiple sub-flows to a network side entity (such as, the AF entity). Alternatively, the network side entity (such as, the PCEF entity) also can detect description information of the multiple sub-flows.

Figure 3:
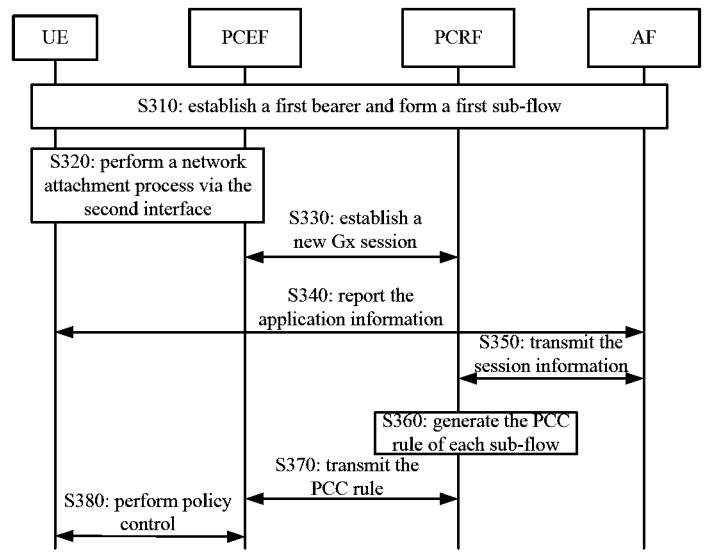
FIG. 3 is schematic diagram of a policy control process according to an exemplary embodiment of the present invention.

FIG. 3 shows a policy control process supporting multiple sub-flows according to an exemplary embodiment of the present invention. In this embodiment, a UE reports information of multiple sub-flows to an AF entity, and the AF entity generates session information including the information of multiple sub-flows, and transmits the session information to the PCRF entity. The PCRF entity obtains association among multiple sub-flows of the same application from the session information, generates the PCC rule for each sub-flow according to the association among multiple sub-flows, and issues the generated PCC rule after the decision to the PCEF entity through different Gx sessions.

In this embodiment, the UE includes a plurality of interfaces for accessing network, and each interface can correspond to different access technologies, or two or more of the plurality of interfaces can correspond to the same access technology. For example, the UE can include a first interface and a second interface, the first interface can access network using, for example, GERAN/UTRAN technology, and the second interface can access network using, for example, E-UTRAN technology or other technology; for another example, the UE can include a first interface and a second interface, and both of the first interface and the second interface adopt the GERAN/UTRAN technology to access the network. Of course, those described above are merely exemplary for the UE, but not intended to limit embodiments of the present invention; the UE can include two or more interfaces, and each interface can access network using any one of access technologies of 3GPP and non-3GPP wireless systems.

Referring to FIG. 3, in S310, the UE (such as UE 190) establishes a first bearer via the first interface to transmit service data of an application, and thus a first sub-flow of the application is formed. The process of establishing the first bearer is not intended to limit embodiments of the present invention. The first bearer can be established with a method in the prior art, or in accordance with the policy control process shown in FIG. 2, and the details will not be described herein again so as not to obscure the focus of embodiments of the present invention. During the process of establishing the first bearer, the UE obtains a first IP address associated with the first interface. In embodiments of the present invention, the IP address can be an IPv4 address or an IPv6 address. Furthermore, as described in FIG. 2, during the process of establishing the first bearer, a first Gx session is established between the PCEF entity and the PCRF entity, and a first Rx session is established between the PCRF entity and the AF entity. Both the first Gx session and the first Rx session are associated with the first IP address.

Next, the UE performs operations of establishing the bearers via other interfaces to transmit the service data of the application so as to form other sub-flows of the application. The process of establishing the bearer and the policy control process for other respective interface other than the first interface are substantially the same, and therefore, the second interface is described hereinafter as an example.

In S320, the UE initiates a network attachment process via the second interface, and obtains a second IP address associated with the second interface.

In S330, a second Gx session is newly established between the PCEF entity (such as the PCEF entity 120) and the PCRF entity (such as the PCRF entity 110), and the second Gx session is associated with the second IP address of the UE.

In S340, the UE interacts with the AF entity (such as, AF entity 130) to report the application information including the description information of the sub-flows. According to embodiments of the present invention, the application information reported by the UE to the AF entity also includes the description information of the sub-flows in addition to application layer session information associated with the application and described with reference to S230. The description information of the sub-flows can include IP address information and related information of QoS of all the sub-flows associated with the application. Specifically, in this example, the IP address of all the sub-flows associated with the application can include the first IP address information and the second IP address information, and the first IP address is identified as a contact address of the application. A network side learns that sub-flows associated with the first IP address and the second IP address belong to the same application, by carrying the first IP address information and the second IP address information in the application information. Furthermore, the related information of QoS can be QoS requirement information of each sub-flow and/or access type information of each sub-flow. Specifically, if the UE can obtain the QoS requirement information of each sub-flow, the application information can carry the QoS requirement information of each sub-flow, such as the bandwidth required and the time delay requirement of each sub-flow; in a case where the UE fails to obtain the accurate QoS requirement information of each sub-flow, the application information can carry access type information of each sub-flow, and the access type information indicates the type of the network access technology corresponding to each sub-flow. Generally, the access type information of the sub-flow can reflect the QoS requirement of the sub-flow. For example, in an IMS, the UE can report the application information to the AF entity by way of initiating an SIP registration to the P-CSCF.

In S350, the AF entity receives the application information from the UE, generates session information corresponding to the application information, and transmits the session information to the PCRF entity via the first Rx session associated with the first IP address for processing.

For example, after receiving the application information transmitted from the UE, the AF entity extracts content in the application information, packages it in an attribute value pair (AVP, Attribute Value Pair) and transmits it to the PCRF entity through a Diameter protocol message.

For example, the AF entity can provide the session information to the PCRF entity through an authentication authorization request (Authentication Authorization (AA) Request) message in the Diameter protocol. An example of the AA Request message is described hereinafter:

```
<AA-Request> ::= < Diameter Header: 265, REQ, PXY >
    < Session-Id >
    { Auth-Application-Id }
...(omitted)
    *[ Supported-Features ]
    [ Reservation-Priority ]
    [ Framed-IP-Address ]
    [ Framed-IPv6-Prefix ]
    *[ AVP ]
```

In this embodiment, a new feature Sub-Flow-Capable is added in the Supported-Features AVP, and the feature indicates that the currently transmitted session information corresponds to the multiple sub-flows of the same application. Within the AVP including the feature Sub-Flow-Capable, the Sub-Flow Description (sub-flow description) AVP describes information of each sub-flow, including at least one of information indicating a connection where the sub-flow is located (such as a connection identifier (CID, Connection-Id)), an IP address corresponding to each sub-flow (Framed-IP-Address/Framed-IPv6-Prefix), an access type (RAT-Type) and QoS requirement information of each sub-flow (Media-Component-Description). An example of the Sub-Flow-Capable AVP is described hereinafter:

```
<Sub-Flow Description> ::= < AVP Header >
    < Connection-Id >
    [ AF-Application-Identifier ]
    *[ Media-Component-Description ]
    [Service-Info-Status ]
    [ AF-Charging-Identifier ]
    [ RAT-Type ]
    *[ Specific-Action ]
    [ Framed-IP-Address ]
    [ Framed-IPv6-Prefix ]
    *[ AVP ]
```

In S360, the PCRF entity receives the session information (such as AA request message) transmitted by the AF entity, extracts description information of each sub-flow belonging to the same application therefrom, and generates the PCC rule corresponding to each sub-flow according to the description information of each sub-flow. Specifically, the PCRF entity extracts a value of the feature Sub-Flow-Capable from the received session information, and obtains the description information of multiple sub-flows belonging to the same application from the Sub-Flow Description AVP in the feature, such as an IP address, an access type or QoS requirement information of each sub-flow. The PCRF entity can find out corresponding multiple Gx sessions through the IP address (Framed-IP-Address/Framed-IPv6-Prefix) of the sub-flow. Furthermore, the PCRF entity can generate the PCC rule corresponding to each sub-flow according to the access type (RAT-Type) and QoS requirement information (such as, QoS description Media-Component-Description) of each sub-flow. For example, in terms of guaranteed bit rate (GBR, Guaranteed Bit Rate) service, if the related information of QoS of a sub-flow carries QoS requirement information of the sub-flow, the PCC rule can be generated according to the QoS requirement information of the sub-flow. Otherwise, if the QoS description attribute of the sub-flow fails to carry the QoS information of the sub-flow, the PCC rule of multiple sub-flows of the application is adjusted with a preset policy according to the access type, for example, the WiFi access sub-flow can be allocated with a higher bandwidth, while 3GPP access sub-flow can be allocated with a lower bandwidth.

In this embodiment, the PCRF entity maintains relation among the PCC rule of multiple sub-flows of this application.

In S370, the PCRF entity issues the generated PCC rule to the PCEF entity via corresponding Gx session. As for the generated sub-flow (such as, the first sub-flow), the PCC rule can be transmitted to the PCEF entity only when the PCC rule is modified.

For example, if the PCEF entity initiates a PCC rule request, the PCRF entity can transmit a credit control answer (CC-Answer, Credit Control Answer) message to the PCEF entity based on a Diameter protocol for providing the PCC rule. For another example, if the PCRF entity provides initiatively the PCC rule, the PCRF entity can transmit a re-authentication request (Re-Auth-Request, Re-Authentication Request) message to the PCEF entity for providing the PCC rule. Herein, the CC-Answer message is described in detail as an example. Since the multiple sub-flows correspond to multiple Gx sessions, all the multiple Gx sessions need to transfer the PCC rule. An example of the CC-Answer message is described hereinafter according to embodiments of the present invention:

```
<CC-Answer> ::= < Diameter Header: 272, PXY >
    < Session-Id >
    { Auth-Application-Id }
...(omitted)
    *[ QoS-Information ]
    [ Revalidation-Time ]
    [ Default-EPS-Bearer-QoS ]
    [ Bearer-Usage ]
    *[ Usage-Monitoring-Information ]
    *[ AVP ]
```

Compared to the traditional CC-Answer message, the above CC-Answer message mainly modifies in the QoS-Information AVP, and the value thereof is as follows:

```
QoS-Information ::=   < AVP Header: 1016 >
    [ QoS-Class-Identifier ]
    [ Max-Requested-Bandwidth-UL ]
    [ Max-Requested-Bandwidth-DL ]
    [ Guaranteed-Bitrate-UL ]
    [ Guaranteed-Bitrate-DL ]
    [ Bearer-Identifier ]
    [ Allocation-Retention-Priority]
    [ APN-Aggregate-Max-Bitrate-UL]
    [ APN-Aggregate-Max-Bitrate-DL]
    * [AVP]
```

In terms of a GBR service, values of, for example, QoS-Class-Identifier, Guaranteed-Bitrate-UL and Guaranteed-Bitrate-DL are mainly modified in the provided PCC rule. The QoS-Class-Identifier indicates a QoS class identifier (QCI), the Guaranteed-Bitrate-UL indicates a guaranteed uplink bitrate, and the Guaranteed-Bitrate-DL indicates a guaranteed downlink bitrate.

In S380, the PCEF entity performs policy control of the corresponding sub-flow according to the PCC rule received from the PCRF entity.

Up to this point, the establishing of the second bearer completes, and the policy control to two sub-flows is accomplished. As described above, if the UE continues to establish a third bearer through a third interface so as to transmit the service data of the application and thus form a third sub-flow of the application, the operations of S320-S380 are repeated, in particular, in S340, the application information reported by the UE to the AF entity can include description information of the first, second and third sub-flows, such as IP address information and related information of quality of service.

In the above policy control solution of multiple sub-flows, during the process of establishing the second bearer and subsequent bearer, the application information reported by the UE to the AF entity includes description information of the multiple sub-flows, the AF entity considers the application information received from the UE as a modification of ordinary application information, converts the application information to the session information, and transmits the session information to the PCRF entity via the first Rx session associated with the first IP address for processing, so that the PCRF entity can maintain the relationship among multiple sub-flows of the same application.

With this embodiment, through the application information reported by the UE, a network side entity, such as the PCRF entity, can learn that the same application includes multiple sub-flows, and obtain the description information of each sub-flow, so that policy control for multiple sub-flows can be performed correctly.

Figure 4:
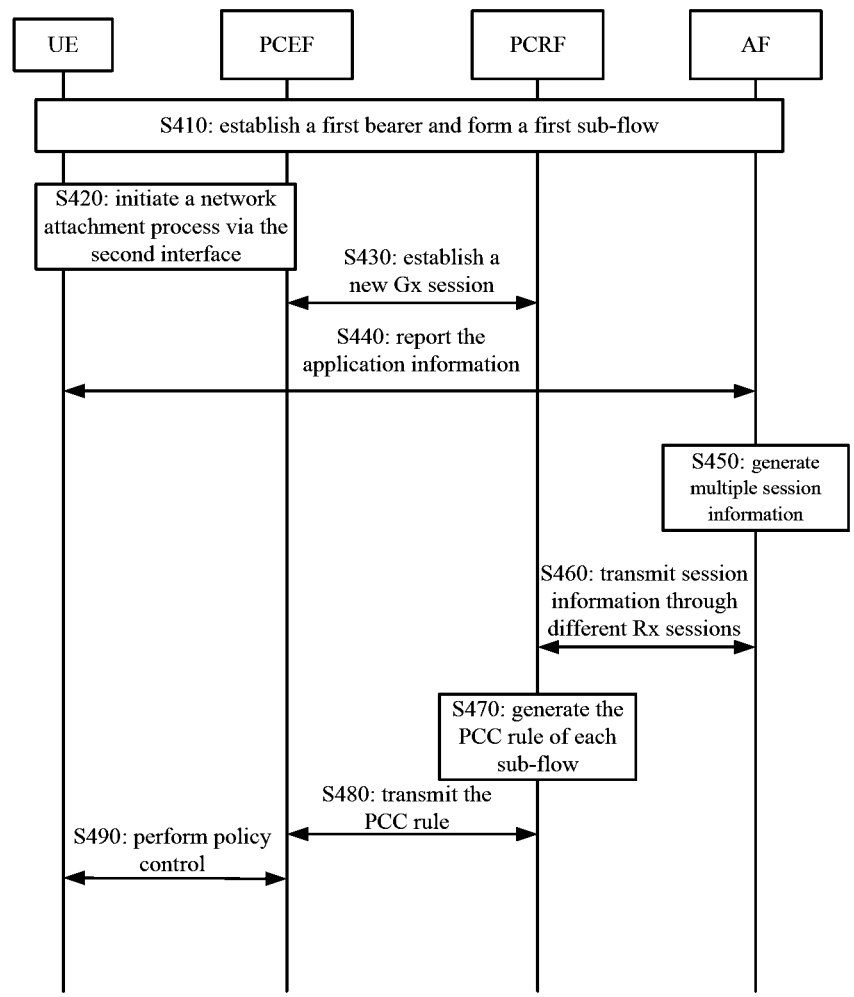
FIG. 4 is schematic diagram of a policy control process according to another exemplary embodiment of the present invention.

FIG. 4 is schematic diagram of a policy control process of multiple sub-flows according to another exemplary embodiment of the present invention. In this embodiment, the AF entity maintains the association among multiple sub-flows of the same application. In this embodiment, the UE reports the application information including description information of the multiple sub-flows. The AF entity learns, from the application information, association among multiple sub-flows of the same application, generates multiple different Gx session information, and transmits the multiple different Gx session information to the PCRF entity. The PCRF entity generates different PCC rule for each sub-flow according to the multiple different session information, and issues the generated PCC rule to the PDN-GW via different Gx interface corresponding to each sub-flow.

Similar to the embodiment described with reference to FIG. 3, in this embodiment, the UE includes a plurality of interfaces for accessing network, each interface can correspond to different access technologies, or two or more of the plurality of interfaces can correspond to the same access technology. Referring to FIG. 4, in S410, the UE (such as, UE 190) establishes a first bearer via the first interface to transmit the service data of an application, and thus a first sub-flow of the application is formed. S410 is substantially the same as S310 in FIG. 3, and the details will not be described again for the sake of brevity.

Next, the UE performs operations of establishing the bearer via other interfaces to transmit the service data of an application, and thus forming other sub-flows of the application. The process of establishing the bearer and the policy control process for other respective interface other than the first interface are substantially the same, and therefore, the second interface is described hereinafter as an example.

In S420, the UE initiates a network attachment process via the second interface, and obtains a second IP address associated with the second interface. S420 is substantially the same as S320 described with reference to FIG. 3.

In S430, a second Gx session is established between the PCEF entity (such as, the PCEF entity 120) and the PCRF entity (such as the PCRF entity 110), and the second Gx session is associated with the newly-allocated second IP address of the UE. S430 is substantially the same as S330 described with reference to FIG. 3.

In S440, the UE interacts with the AF entity (such as, AF entity 130) to report the application information including the description information of the multiple sub-flows. S440 is substantially the same as S340, and the details will not be described again for the sake of brevity.

In S450, after receiving the application information, the AF entity identifies that the application information includes description information of multiple different sub-flows, and hereby decides to generate multiple session information, wherein each session information includes the description information of the multiple sub-flows. For example, in this embodiment, the AF entity identifies that the application information includes description information of the first sub-flow and the second sub-flow, and thus generates a first session information corresponding to the first sub-flow and a second session information corresponding to the second sub-flow according to the description information. Both the first session information and the second session information include description information of the first sub-flow and the second sub-flow. In S460, the AF entity transmits respective session information to the PCRF entity through different Rx session. For example, the AF entity transmits the session information corresponding to the first sub-flow to the PCRF entity through the established first Rx session, newly establishes a second Rx session associated with the second IP address, and transmits the session information corresponding to the second sub-flow to the PCRF entity through the second Rx session.

For example, the AF entity provides the session information to the PCRF entity through an AA-Request message in the Diameter protocol on each Rx session. For example, in this embodiment, the content and the structure of the AA-Request message are substantially the same as those of the AA-Request message described with reference to FIG. 3, and the details will not be described again for the sake of brevity.

In this embodiment, the AF entity maintains relationship among the multiple sub-flows of this application.

In S470, the PCRF entity receives the multiple session information (such as multiple AA-Request messages) transmitted from the AF entity, extracts description information of each sub-flow belonging to the same application therefrom, and generates the PCC rule corresponding to each sub-flow according to the description information (such as, an access type (RAT-Type) or a QoS requirement description (Media-Component-Description) of each sub-flow) of each sub-flow. Different from S360, in S470, multiple session information are received from the AF entity on the multiple Rx sessions. However, in S470, the PCRF entity extracts the description information of the multiple sub-flows from the session information, and generates the PCC rule corresponding to each sub-flow according to the description information of the multiple sub-flows, the specific operation of which is similar to that of S360, and the details will not be described again for the sake of brevity.

In S480, the PCRF entity issues the generated multiple PCC rules to the PCEF entity via corresponding Gx interfaces respectively. As for the generated sub-flow, the PCC rule can be transmitted to the PCEF entity only when the PCC rule is modified. S480 is substantially the same as S370, and the details will not be described again for the sake of brevity.

In S490, the PCEF entity performs policy control of the corresponding sub-flow according to the PCC rule received from the PCRF entity.

Up to this point, the establishing of the second bearer completes, and the policy control to two sub-flows is accomplished. If the UE continues to establish a third bearer through a third interface so as to transmit the service data of the application and thus form a third sub-flow of the application, the operations of S420-S490 are repeated.

In the above policy control solution of multiple sub-flows, during the process of establishing the second bearer and subsequent bearer, the application information reported by the UE to the AF entity includes description information of the multiple sub-flows. After receiving the application information transmitted by the UE, the AF entity identifies the description information of the multiple sub-flows, generates and transmits multiple corresponding session information to the PCRF entity, and maintains the relationship among multiple sub-flows of the same application.

In this embodiment, through the application information reported by the UE, a network side entity, such as the AF entity and the PCRF entity, can learn that the same application includes multiple sub-flows, and obtain the description information of each sub-flow, so that policy control for multiple sub-flows can be performed correctly.

Figure 5:
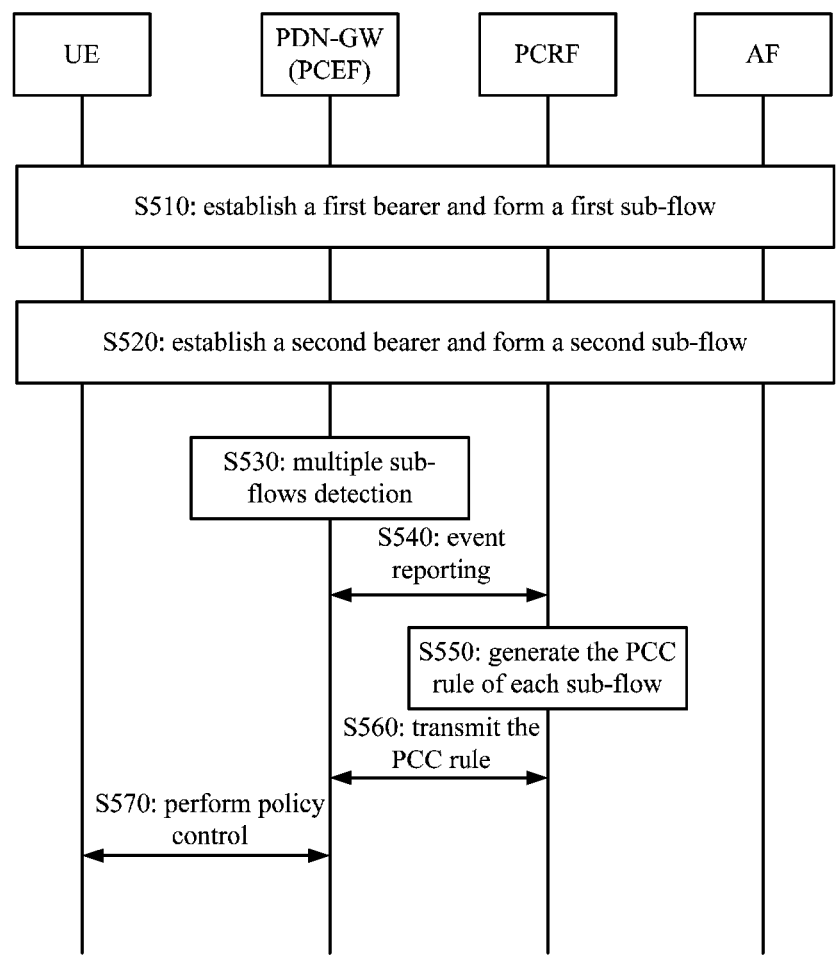
FIG. 5 is schematic diagram of a policy control process according to another exemplary embodiment of the present invention.

FIG. 5 is schematic diagram of a policy control process of multiple sub-flows according to another exemplary embodiment of the present invention. In this embodiment, the PCEF entity identifies that multiple sub-flows belong to the same application. According to this embodiment, the PCEF entity can identify whether the multiple sub-flows belong to the same application with a deep packet inspection (DPI, Deep Packet Inspection) technique. For example, a device for identifying multiple sub-flows can be deployed in the network. For example, a device for deep packet inspection (DPI, Deep Packet Inspection) can be deployed in such as the PCEF entity, so as to identify that multiple sub-flows belong to the same application. The DPI technique and DPI device are known in the art, and the details will not be described again for the sake of brevity. After identifying that multiple sub-flows belong to the same application with the DPI technique, the PCEF entity reports this information to the PCRF entity through an event, the PCRF entity generates different PCC rules for multiple sub-flows after receiving the information, and issues the generated corresponding PCC rules to the PCEF entity via different Gx interfaces.

In this embodiment, the UE includes a plurality of interfaces for accessing network, each interface can correspond to different access technologies, or two or more of the plurality of interfaces can correspond to a same access technology. In this context, although it is described by taking the case where the UE includes two interfaces as an example, it should be noted that embodiments of the present invention are not limited to this, and the UE also can include more interfaces.

Referring to FIG. 5, in S510, the UE establishes a first bearer via a first interface, transmits service data of an application through the first bearer, and thus a first sub-flow of the application is formed. In S520, the UE establishes a second bearer via a second interface, transmits service data of the application through the second bearer, and thus a second sub-flow of the application is formed. The embodiments of the present invention are not intended to limit processes of establishing the first bearer and the second bearer. The first bearer and the second bearer can be respectively established with a method in the prior art, or in accordance with the policy control process shown in FIG. 2, and the details will not be described herein again so as not to obscure the focus of embodiments of the present invention. During the processes of establishing the first bearer and the second bearer, the UE respectively obtains a first IP address and a second IP address associated with the first interface and the second interface. In embodiments of the present invention, the IP address can be an IPv4 address or an IPv6 address. Furthermore, during the process of establishing the first bearer, a first Gx session is established between a PCEF entity and a PCRF entity, and a first Rx session is established between the PCRF entity and an AF entity. Both the first Gx session and the first Rx session are associated with the first IP address. Likewise, during the process of establishing the second bearer, a second Gx session is established between the PCEF entity and the PCRF entity, and a second Rx session is established between the PCRF entity and the AF entity. Both the second Gx session and the second Rx session are associated with the second IP address.

In S530, the PDN-GW performs flow inspection on the passed data flow, and finds that multiple service data flows therefrom belong to the same application, that is, inspects that multiple sub-flows belong to the same application. For example, it can be confirmed that service data flows connecting to the same opposite-end and having the same connection identifier (CID, Connection IDentifier) belong to the same application, and are sub-flows belonging to the application. The multiple sub-flows can be inspected with the DPI technique, for example, a DPI device can be deployed in the network for inspecting the multiple sub-flows.

In S540, when the PDN-GW identifies that the multiple service data flows belong to the same application, that is, they are sub-flows belonging to the same application, the PDN-GW can trigger an event reporting process to transmit an event reporting message to the PCRF entity, and the event reporting message carries the description information of multiple sub-flows of the same application, including such as, an IP address of each sub-flow, as well as access type information or QoS requirement information of each sub-flow. If the event reporting message carries the QoS requirement information, a DPI device can be additionally provided to perform corresponding operations.

In S550, the PCRF entity receives the event reporting message, extracts and maintains the description information of multiple sub-flows belonging to the same application, and generates the PCC rule with respect to each sub-flow according to the description information of multiple sub-flows in the event reporting message.

In S560, the PCRF entity issues the generated PCC rule to the PDN-GW via a corresponding Gx interface. As for the generated sub-flow, the PCC rule can be transmitted to the PDN-GW only when the PCC rule is modified. The specific signaling packet used in S560 is substantially the same as the description with reference to S370, and the details will not be described again for the sake of brevity.

In S570, the PDN-GW performs policy control of the corresponding sub-flow according to the PCC rule received from the PCRF entity.

In this embodiment, optionally, after receiving the event reporting message, the PCRF entity can notify the AF entity of the description information of multiple sub-flows.

In this embodiment, the network side device, such as the PDN-GW, obtains by inspection that the multiple sub-flows belong to the same application, so that policy control for the multiple sub-flows can be performed correctly.

Figure 6:
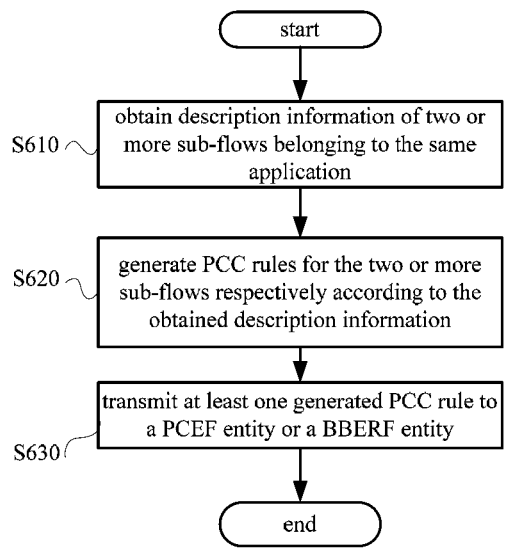
FIG. 6 is a flow chart of a policy control method according to an embodiment of the present invention.

FIG. 6 is a flow chart of a policy control method 600 according to an embodiment of the present invention. In the mobile communication system which using the policy control method 600, service data of one application can be transmitted through multiple sub-flows at the same time. The policy control method 600 can be implemented by such as a PCRF entity (such as, PCRF entity 110).

As shown in FIG. 6, in S610, the PCRF entity obtains description information of two or more sub-flows belonging to the same application.

In S620, the PCRF entity respectively generates PCC rules for the two or more sub-flows according to the obtained description information of the two or more sub-flows.

In S630, the PCRF entity transmits at least one generated PCC rule to a PCEF entity or a BBERF entity, so as to perform policy control for the sub-flows by the PCEF entity or the BBERF entity.

In one embodiment, the description information of multiple sub-flows obtained in S610 can include an IP address associated with each sub-flow of two or more sub-flows, and access type information and/or quality of service QoS requirement information of each sub-flow. The IP address can be an IPV4 address or an IPV6 address. The access type information indicates a type of the access technology adopted by each sub-flow. For example, the access technologies which can be adopted by the sub-flow can include GERAN/UTRAN, E-UTRAN WLAN, WiMAX, CDMA2000 and so on, however, the present invention is not limited to this, and any other appropriate access technologies also can be used. The access type information of the sub-flow can reflect the QoS requirement of each sub-flow.

In one embodiment, for example, as described with reference to FIG. 3 or FIG. 4, an AF entity (such as, the AF entity 130) receives application information including description information of two or more sub-flows from the UE (such as, UE 190), converts the application information to session information and transmits the session information to the PCRF entity. In S620, the PCRF entity can receive the session information and extract description information of the two or more sub-flows therefrom.

In an embodiment, for example, as described in FIG. 5, when inspecting that the two or more sub-flows belong to a same application, the PCEF entity or the BBERF entity transmits the description information of two or more sub-flows to the PCEF entity. For example, the PCEF entity or the BBERF entity can inspect two or more sub-flows belonging to the same application with the DPI technique (such as, with the DPI device deployed in the network). For example, the PCEF entity or the BBERF entity inspects according to an identifier of the application that the two or more sub-flows belong to the same application. In S620, the PCRF entity can receive description information of two or more sub-flows transmitted by the PCEF entity or the BBERF entity, so as to obtain the description information.

In one embodiment, in S630, as for the generated sub-flow, the PCRF entity can transmit the PCC rule to the PCEF only when the PCC rule is modified.

According to this embodiment, a network side entity, such as the PDN-GW, can obtain that the same application includes multiple sub-flows, and obtain the description information of each sub-flow, so that policy control for multiple sub-flows can be performed correctly.

Figure 7:
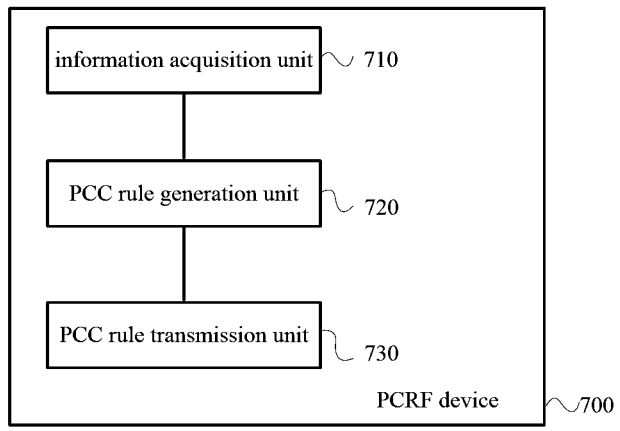
FIG. 7 is a schematic block diagram of a PCRF device according to an embodiment of the present invention.

FIG. 7 is a schematic block diagram of a PCRF device 700 according to an embodiment of the present invention.

As shown in FIG. 7, the PCRF device 700 includes an information acquisition unit 710, a PCC rule generation unit 720 and a PCC rule transmission unit 730. The information acquisition unit 710 is configured to obtain description information of two or more sub-flows belonging to a same application. The PCC rule generation unit 720 is configured to respectively generate PCC rules for the two or more sub-flows according to the description information of the two or more sub-flows. The PCC rule transmission unit 730 is configured to transmit at least one generated PCC rule to a PCEF entity or a BBERF entity, so as to perform policy control for the corresponding sub-flows by the PCEF entity or the BBERF entity.

The PCRF device 700 can be used to implement the method described with reference to FIG. 6. For the sake of brevity, and the details will not be described again.

The PCRF device according to this embodiment can learn that the same application includes multiple sub-flows, and learn the description information of each sub-flow, so that the appropriate PCC rules can be generated to perform the policy control for multiple sub-flows correctly.

Figure 8:
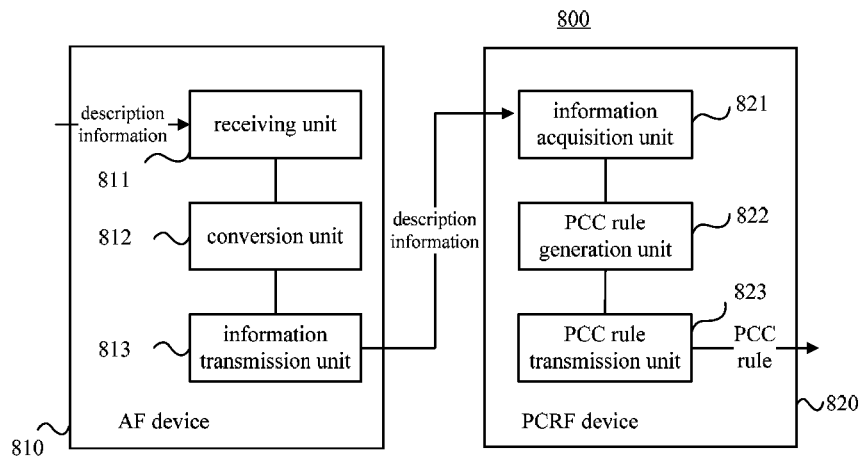
FIG. 8 is a schematic block diagram of a PCC system according to an embodiment of the present invention.

FIG. 8 is a schematic block diagram of a PCC system 800 according to an embodiment of the present invention.

As shown in FIG. 8, the PCC system 800 includes an AF device 810 and a PCRF device 820. The AF device 810 includes a receiving unit 811, a conversion unit 812 and an information transmission unit 813. The receiving unit 811 is configured to receive application information from a user equipment (UE), wherein the application information includes description information of two or more sub-flows belonging to a same application. The conversion unit 812 is configured to convert the application information to session information. The information transmission unit 813 is configured to transmit the session information to the PCRF device 820, wherein the session information includes description information of two or more sub-flows. The PCRF device 820 includes an information acquisition unit 821, a PCC rule generation unit 822 and a PCC rule transmission unit 823. The information acquisition unit 821 is configured to receive the session information transmitted by the information transmission unit 813 and obtain the description information of two or more sub-flows from the session information. The PCC rule generation unit 822 is configured to respectively generate PCC rules for the two or more sub-flows according to the description information of the two or more sub-flows. The PCC rule transmission unit 823 is configured to transmit at least one generated PCC rule to a PCEF entity or a BBERF entity, so as to perform policy control for the sub-flows by the PCEF entity or the BBERF entity.

The PCC system 800 as shown in FIG. 8 can perform processes described with reference to FIG. 3 or FIG. 4. For the sake of brevity, and the details will not be described again.

According to this embodiment, the UE transmits description information of the multiple sub-flows to the network side entity, so that the network side entity can generate appropriate PCC rules according to the description information of the multiple sub-flows, and thus perform policy control for the multiple sub-flows correctly.

Figure 9:
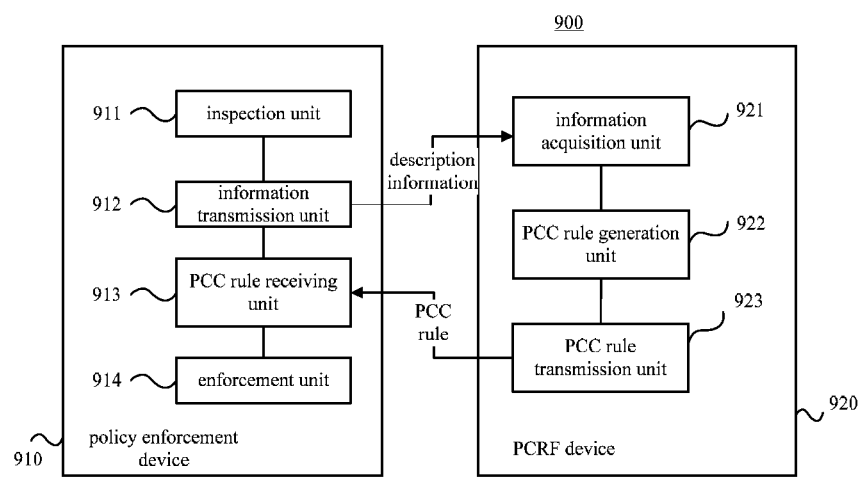
FIG. 9 is a schematic block diagram of a PCC system according to another embodiment of the present invention.

FIG. 9 is a schematic block diagram of a PCC system 900 according to an embodiment of the present invention.

As shown in FIG. 9, the PCC system 900 includes a policy enforcement device 910 and a PCRF device 920. The policy enforcement device 910 includes an inspection unit 911, an information transmission unit 912, a PCC rule receiving unit 913 and an enforcement unit 914. The inspection unit 911 is configured to inspect whether two or more sub-flows belong to a same application. The information transmission unit 912 is configured to transmit description information of the two or more sub-flows to a PCRF entity when inspecting that the two or more sub-flows belong to a same application; The PCC rule receiving unit 913 is configured to receive a PCC rule from the PCRF device 920. The enforcement unit 914 is configured to perform policy control for the sub-flows based on the PCC rule received by the PCC rule receiving unit 913. The PCRF device 920 includes a receiving unit 921, a PCC rule generation unit 922 and a PCC rule transmission unit 923. The receiving unit 921 is configured to receive the description information of the two or more sub-flows transmitted by the information transmission unit 912 of the policy enforcement device 910. The PCC rule generation unit 922 is configured to respectively generate PCC rules for the two or more sub-flows according to the received description information of the two or more sub-flows. The PCC rule transmission unit 923 is configured to transmit at least one generated PCC rule to the policy enforcement device 910. The policy enforcement device 910 can be a PCEF entity or a BBERF entity.

The PCC system 900 can be used to implement the process described with reference to FIG. 5. For the sake of brevity, and the details will not be described again.

In this embodiment, when inspecting that the multiple sub-flows belong to the same application, the network side policy enforcement device (such as, a PCEF entity/a BBERF entity) transmits the description information of the multiple sub-flows to a PCRF entity, so that the PCRF entity can generate the PCC rule applicable to each sub-flow and thus can perform policy control for the multiple sub-flows correctly.

With the policy control method and the related device supporting multiple sub-flows according to embodiments of the present invention, a network side entity of the 3GPP network learns that a same application includes multiple sub-flows, and learns the description information of each sub-flow, such as IP address information, related information of QoS and so on, so that policy control for multiple sub-flows can be performed correctly.

A detailed description of embodiments of the present invention is given above with the accompanying drawings.

Steps of methods and algorithms described in combination with the embodiments disclosed herein can be implemented by a hardware, or a relevant hardware under instructions of a program. The program can be stored in a computer readable storage medium, such as a random access memory (RAM), a memory, a read only memory (ROM), an electrically programmable ROM, an electrically erasable programmable ROM, a register, a hard disk, a removable disk, a CD-ROM, or any other form of storage mediums known in the art.

While some embodiments have been shown and described, it will be understood by persons skilled in the art that various modifications may be made to these embodiments without departing from the principle and spirit of the present invention, and such modifications shall fall within the scope of the present invention.

What is claimed is:

1. A policy control method, comprising:
   obtaining, by a policy and charging rule function (PCRF) entity, a message including description information of two sub-flows which belong to a same application and are formed via different interfaces of a user equipment (UE);
   obtaining, by the PCRF entity, an association between the two sub-flows of the same application from the message;
   generating, by the PCRF entity, a policy and charging control (PCC) rule for each sub-flow of the two sub-flows according to the description information corresponding to each sub-flow and the association between the two sub-flows of the same application; and
   transmitting, by the PCRF entity, the generated PCC rule to a policy and charging enforcement function (PCEF) entity or a bearing binding and event report function (BBERF) entity, wherein the PCEF entity or the BBERF entity is configured to perform policy control for the two sub-flows.

2. The policy control method according to claim 1, wherein the description information corresponding to each sub-flow comprises:
   an Internet protocol (IP) address; and
   access type information and/or quality of service (QoS) requirement information.

3. The policy control method according to claim 1, wherein the obtaining comprises:
   receiving, through an authentication authorization request message, session information transmitted by an application function (AF) entity, wherein the session information comprises the description information of the two sub-flows; and
   obtaining the description information of two sub-flows from the session information.

4. The policy control method according to claim 3, wherein the session information transmitted by the AF entity is converted from application information transmitted to the AF entity by the UE, and the application information comprises the description information of the two sub-flows.

5. The policy control method according to claim 3, wherein receiving the session information comprises:
   receiving the session information transmitted by the AF entity through two Rx sessions, wherein the session information comprises the description information of the two sub-flows, and each Rx session of the two Rx sessions is associated with one of the two sub-flows.

6. The policy control method according to claim 3, wherein receiving the session information comprises:
   receiving session information transmitted by the AF entity through a single Rx session, wherein the session information comprises the description information of the two sub-flows, and the single Rx session is associated with an initially established sub-flow of the two sub-flows.

7. The policy control method according to claim 1, wherein the obtaining comprises:
   receiving, through an event reporting message, the description information of the two sub-flows transmitted by the PCEF entity or the BBERF entity.

8. The policy control method according to claim 7, wherein the PCEF entity or the BBERF entity transmits the description information of the two sub-flows after inspecting that the two sub-flows belong to the application.

9. The policy control method according to claim 8, wherein the PCEF entity or the BBERF entity inspects whether the two sub-flows belong to the application using a deep packet inspection DPI technique.

10. The method according to claim 8, wherein the PCEF entity or the BBERF entity inspects whether the two sub-flows belong to the application based on an identifier of the application.

11. A non-transitory computer-readable medium, part of a policy and charging rule function (PCRF) device, having processor-executable instructions stored thereon for policy control, the processor-executable instructions including instructions for:
    obtaining a message including description information of two sub-flows which belong to a same application and are formed via different interfaces of a user equipment (UE);
    obtaining, by the PCRF entity, an association between the two sub-flows of the same application from the message;
    generating a policy and charging control (PCC) rule for each sub-flow of the two sub-flows according to the description information corresponding to each sub-flow and the association between the two sub-flows of the same application; and
    transmitting the generated PCC rule to a policy and charging enforcement function (PCEF) entity or a bearing binding and event report function (BBERF) entity, wherein the PCEF entity or the BBERF entity is configured to perform policy control for the two sub-flows.

12. The non-transitory computer-readable medium according to claim 11, wherein the description information corresponding to each sub-flow comprises:
    an Internet protocol (IP); and
    access type information and/or quality of service (QoS) requirement information.

13. The non-transitory computer-readable medium according to claim 11, wherein the processor-executable instructions further include instructions for:
    receiving, through an authentication authorization request message, session information transmitted by an application function (AF) entity, wherein the session information comprises the description information of the two sub-flows; and
    obtaining the description information of the two sub-flows from the session information.

14. The non-transitory computer-readable medium according to claim 13, wherein the session information transmitted by the AF entity is converted from application information transmitted to the AF entity by the UE, and the application information comprises the description information of the two sub-flows.

15. The non-transitory computer-readable medium according to claim 13, wherein the processor-executable instructions further include instructions for receiving the session information transmitted by the AF entity through two Rx sessions, wherein the session information comprises the description information of the two sub-flows, and each Rx session of the two Rx sessions is associated with one of the two sub-flows.

16. The non-transitory computer-readable medium according to claim 13, wherein the processor-executable instructions further include instructions for receiving session information transmitted by the AF entity through a single Rx session, wherein the session information comprises the description information of the two sub-flows, and the single Rx session is associated with an initially established sub-flow of the two sub-flows.

17. The non-transitory computer-readable medium according to claim 11, wherein the processor-executable instructions further include instructions for receiving, through an event reporting message, the description information of the two sub-flows transmitted by the PCEF entity or the BBERF entity.

18. The non-transitory computer-readable medium according to claim 17, wherein the PCEF entity or the BBERF entity transmits the description information of the two sub-flows after inspecting that the two sub-flows belong to the application.

19. The non-transitory computer-readable medium according to claim 18, wherein the PCEF entity or the BBERF entity inspects whether the two sub-flows belong to the application using a deep packet inspection (DPI) technique.

20. The non-transitory computer-readable medium according to claim 18, wherein the PCEF entity or the BBERF entity inspects whether the two sub-flows belong to the application based on an identifier of the application.

21. A non-transitory computer-readable medium, part of a policy enforcement device, having processor-executable instructions stored thereon for policy control, the processor-executable instructions including instructions for:
   inspecting whether two sub-flows belong to a same application and are formed via different interfaces of a user equipment (UE);
   transmitting an event reporting message including description information of the two sub-flows to a policy and charging rule function (PCRF) entity after inspecting that the two sub-flows belong to the application and are formed via different interfaces of the UE, so that the PCRF entity obtains association between the two sub-flows of the same application from the message and generates a policy and charging control (PCC) rule for each sub-flow of the two sub-flows according to the description information corresponding to each sub-flow and the association between the two sub-flows of the same application;
   receiving the generated PCC rule from the PCRF entity; and
   performing policy control for the two sub-flows based on the received PCC rule.

22. The non-transitory computer-readable medium according to claim 21, wherein the description information corresponding to each sub-flow comprises:
   an Internet protocol (IP) address; and
   access type information and/or quality of service (QoS) requirement information.

* * * * *